(12) United States Patent
Enenkel et al.

(10) Patent No.: US 12,037,138 B2
(45) Date of Patent: Jul. 16, 2024

(54) CONVEYING SYSTEM HAVING VERTICALLY TRAVELING DRIVERLESS TRANSPORT VEHICLES

(71) Applicant: SIEMENS LOGISTICS GMBH, Nuremberg (DE)

(72) Inventors: Peter Enenkel, Constance (DE); Rainer Zisch, Oehningen (DE); Rainer Vogel, Constance (DE)

(73) Assignee: Siemens Logistics GmbH, Nuremberg (DE)

( * ) Notice: Subject to any disclaimer, the term of this patent is extended or adjusted under 35 U.S.C. 154(b) by 396 days.

(21) Appl. No.: 17/432,564

(22) PCT Filed: Jan. 28, 2020

(86) PCT No.: PCT/EP2020/051974
§ 371 (c)(1),
(2) Date: Aug. 20, 2021

(87) PCT Pub. No.: WO2020/169307
PCT Pub. Date: Aug. 27, 2020

(65) Prior Publication Data
US 2022/0127015 A1    Apr. 28, 2022

(30) Foreign Application Priority Data
Feb. 20, 2019    (EP) ..................... 19158184

(51) Int. Cl.
*B64F 1/36* (2024.01)
*B60L 5/00* (2006.01)
(Continued)

(52) U.S. Cl.
CPC .............. *B64F 1/368* (2013.01); *B60L 5/005* (2013.01); *B66B 21/04* (2013.01); *G05D 1/0234* (2013.01); *B60L 5/38* (2013.01)

(58) Field of Classification Search
CPC .. B64F 1/368; B64F 1/32; B60L 5/005; B60L 5/38; B60L 50/53; B60L 2200/36;
(Continued)

(56) References Cited

U.S. PATENT DOCUMENTS

2016/0167557 A1* 6/2016 Mecklinger ............. B66F 9/065
                                                         414/812
2017/0136931 A1   5/2017 Colantonio et al.
2018/0141752 A1   5/2018 Nakanishi et al.

FOREIGN PATENT DOCUMENTS

| DE | 102006035092 A1 | 2/2008 |
| DE | 202007014834 U1 | 3/2008 |
| WO | 2017103937 A1 | 6/2017 |

OTHER PUBLICATIONS

WEASEL—Fahrerloses Transportsystem fuer flexible innerbetriebliche Warentransporte, [WEASEL—Automated Guided Vehicle for Flexible, Internal Transport of Goods], ssi-schaefer.com, 2018—English version.

\* cited by examiner

*Primary Examiner* — Abby Y Lin
*Assistant Examiner* — Renee LaRose
(74) *Attorney, Agent, or Firm* — Laurence A. Greenberg; Werner H. Stemer; Ralph E. Locher

(57) ABSTRACT

A driverless transport vehicle, a conveying system, and a method for transporting piece goods. The driverless transport vehicle overcomes a climbing section equipped with a primary side of an energy transmission device. The driverless transport vehicle, which can be moved individually and autonomously on a conveying plane, has a secondary side for energy pick-up in order, assisted by the energy pick-up, to overcome a height difference of the climbing section and/or a transition between the conveying plane and the climbing section. The formation of a connection between the
(Continued)

primary side and the secondary side and the overcoming of the climbing section and of the transition between the conveying plane and the climbing section take place at a throughput speed without a slowing-down.

18 Claims, 6 Drawing Sheets

(51) Int. Cl.
*B60L 5/38* (2006.01)
*B66B 21/04* (2006.01)
*G05D 1/00* (2024.01)

(58) Field of Classification Search
CPC .. B60L 2200/40; B60L 2260/32; B66B 21/04; G05D 1/0234; G05D 2201/0216; Y02T 10/70; Y02T 10/7072; Y02T 90/12; B62D 57/024; B66F 9/063
See application file for complete search history.

CONVEYING SYSTEM HAVING VERTICALLY TRAVELING DRIVERLESS TRANSPORT VEHICLES

FIELD AND BACKGROUND OF THE INVENTION

The present invention relates to the technical field of conveying systems for piece goods with driverless transport vehicles, in particular airport baggage sorting systems.

Driverless transport vehicles (Automated Guided Vehicles—AGVs) currently exist in very many implementations. They can move freely in one plane and thereby perform various transport and sorting tasks. Known AGVs currently move exclusively in one plane.

The problem with using AGVs in current transport systems and the associated technologies in the CEP and airport field and emulating these systems with current AGVs is that vertical travel, in other words approaching different planes at full throughput, is of central importance for these systems. Distribution and sorting tasks take place on different planes. Vertical travel of AGVs would enable distribution and sorting tasks to be undertaken on different planes and thus enable:

ejection into (storage) chutes
emulation of existing plant layouts and conveyance routings, as in vertical conveyance technology (hybrid, retrofit)
layout adjustment to existing buildings
optimum and minimum route guidance.

Height adjustments in current driverless transport systems are implemented by means of hoisting devices directly on the respective AGV (hoisting trucks) or are achieved by the use of external hoisting and lifting devices. However, all these solutions are associated with a reduction in throughput, are complex in design and relatively expensive. Furthermore, these solutions must be oriented to the maximum throughput at the start of planning, so that they do not result in bottlenecks. However, this thwarts the actual advantage of AGV-based conveying systems, namely that it is possible to react in a modular fashion to add-ons and the size of the conveying system can be continuously adjusted.

AGVs exist which can travel vertically with a separate energy supply and a separate drive. However, these AGVs can only negotiate very slight gradients, not more than approximately 2°, at very low speed and low load. To climb larger gradients, a more powerful drive would be needed, the design and energy supply of which would however be complex.

SUMMARY OF THE INVENTION

The object of the present invention is hence to increase the throughput in conveying systems in an advantageous manner. This object is achieved by the solutions described in the autonomous claims.

The inventive solution provides for a driverless transport vehicle (Automated Guided Vehicle, AGV), comprising a load handling device to accept an item of piece goods, and a chassis with a drive means together with a separate energy supply for moving on a conveying plane along an individual conveying section at a throughput speed. The chassis has a secondary side of an energy transmission device, which is designed for energy pick-up with and/or without physical contact during a movement on a climbing section negotiating a height difference and/or on a transition to the climbing section, such that the height difference can be negotiated by said energy pick-up and/or the transition can be negotiated at the throughput speed. The driverless transport vehicle is configured to travel on the climbing section in a variable orientation.

A secondary side within the meaning of the invention should be understood as any device which is configured for energy pick-up from a primary side of the energy transmission device. The energy transmission device is formed by the primary and secondary side. A variable orientation should be understood as both a single, but elective and in this sense variable, fixed orientation of the transport vehicle while traveling on the climbing section, as well as a change in the orientation (either of the entire transport vehicle or of the chassis and/or load handling device) during the travel on the climbing section. The energy picked up can be used both to negotiate the height difference of the climbing section at the throughput speed, and to negotiate the transition at the throughput speed. The driverless transport vehicle is configured to carry out the formation of the energy transmission device, in other words a coupling of the primary side with the secondary side, during a movement at the throughput speed.

The separate energy supply can for example be configured as a battery, chargeable or replaceable, as well as a fuel tank, etc. The throughput speed of the driverless transport vehicle determines, as the maximum speed of the driverless transport vehicle on the substantially horizontal conveying plane, the throughput of the overall system. The driverless transport vehicle can however also move more slowly on the conveying plane. The throughput speed of the AGV can be 2 m/s and more.

The secondary side can be present in addition to the separate energy supply of the drive means or can be comprised thereby. The energy pick-up by the secondary side is an energy output. The energy transmission can take place by way of physical contact (electrical, for example in the manner of a bus catenary system, mechanical, magnetic, electromagnetic, etc.) or without physical contact (inductive, magnetic, electromagnetic, etc.) or in combination.

The driverless transport vehicle is configured to negotiate the climbing section upward and downward. The conveying plane and the climbing section form a convex (downward) or concave (upward) transition. The angle of climb depends on the geometry and layout of the conveying system and is between 0 and 90°, not more than 45° for normal travel. The geometry of the driverless transport vehicle is dimensioned so as to be oriented to the transition such that when traveling it can negotiate the transition (convex or concave) without a significant slowdown in its speed, in other words at a substantially steady throughput speed. The secondary side can be connected/coupled to a primary side of the energy transmission device during a movement at the normal throughput speed, such that this connection setup does not result in a slowdown of the throughput speed. The driverless transport vehicle therefore does not need either to slow down its passage, nor to stop, in order to be connected to the primary side, such that it can pick up the energy.

So that even at large angles of climb and/or high throughput speeds an item of piece goods can be transported safely on the load handling device, the driverless transport vehicle can furthermore comprise at least one orientation device, by means of which the load handling device can be pivotably mounted about at least one horizontal axis, such that the load handling device can be actively and/or passively horizontally oriented both on the conveying plane and also on the climbing section. Thus a support surface of the load handling device is always oriented horizontally and the transport behavior of the driverless transport vehicle is improved. A lateral boundary of the load handling device is thus not essential on the climbing section either. The load handling device can be horizontally oriented actively (so as to be tiltable by a device) and/or passively (swinging, mounted in a hanging manner so as to be pivotable) on the climbing section and on the conveying plane. If the orientation changes during the movement the load handling device can advantageously also be kept horizontal by means of multiple pivot axes, for example via cardanic mounting (in the manner of a ship's compass).

According to one form of embodiment the driverless transport vehicle can furthermore comprise an unloading device, wherein the orientation device can be comprised by the unloading device. This reduces redundancy and permits retrofitting of transport vehicles having existing unloading devices.

According to a further form of embodiment the driverless means of transport can be configured to travel the climbing section with a variable orientation of the chassis or with a fixed longitudinal or transverse orientation of the chassis with a variable or fixed orientation of the load handling device. This mutually autonomous orientation facility of the chassis and of the load handling device permits optimized coordination between the orientation facility of the chassis and the orientation device itself.

In order to transport, load and unload, and secure an item of piece goods properly, the load handling device can be configured as a transport tray and/or crossbelt and/or support surface with or without a partial or full lateral boundary.

According to a further form of embodiment the secondary side can be configured so as to be mechanically connectable to the primary side, such that the primary side acts as a drive means to negotiate the height difference. The secondary side has a mechanical coupling device for this, which can be coupled to the primary side and is configured to form a positive engagement with the primary side.

According to a further form of embodiment the drive means of the chassis can be configured to be supplied with energy by the secondary side without physical contact, such that the height difference can be negotiated with the drive means of the chassis. The secondary side thus supplies, in addition to the separate energy supply, energy to the separate drive means of the driverless transport vehicle, without an additional drive means being necessary.

According to a further form of embodiment the driverless transport vehicle can furthermore comprise an orientation device for navigation, for example using optical and/or track-guided and/or line-guided orientation, of the driverless transport vehicle. The type of navigation can change between the conveying plane and the climbing section and the orientation device is configured for both types of navigation.

The inventive solution furthermore provides for a conveying system for transporting piece goods on a conveying plane. The conveying system comprises a driverless transport vehicle according to one of the above-described forms of embodiment, which can be moved on a conveying plane along an individual conveying section at a throughput speed. The conveying system comprises a climbing section abutting the conveying plane and negotiating a height difference. The conveying system likewise comprises a climbing-section-side primary side of an energy transmission device, which with a variable orientation and during a movement of the driverless transport vehicle on the climbing section and/or on a transition to the climbing section is designed for energy input with and/or without physical contact, such that the height difference and/or the transition can be negotiated for the driverless transport vehicle by this energy input at the throughput speed.

The primary side as a climbing section conveying aid is arranged on and/or at and/or along and/or in or under and/or above the climbing section. The type of energy input of the primary side is adapted to the type of energy output of the secondary side. The conveying system is configured such that the driverless transport vehicle can in principle always be moved at the throughput speed, during the energy input as well as during the production of the coupling or of the connection setup of the energy transmission device, during the negotiation of the transition and on the climbing section. A slower transport speed is of course also possible.

According to one form of embodiment the primary side can be configured for energy input at a variable or fixed longitudinal or transverse orientation of the chassis of the driverless transport vehicle to the climbing section. Since the climbing section can have a straight, curved or helical vehicle track for the driverless transport vehicles, a constant or variable orientation of the load handling device can thus be achieved.

According to a further form of embodiment the primary side can be mechanically connected to the secondary side and thus be configured as a drive means to negotiate the height difference. This enables the height difference and/or the climbing section to be negotiated at the throughput speed, without the separate drive means of the driverless means of transport having to be designed for this additional load.

According to a further form of embodiment the primary side and the secondary side can be configured for the formation and disconnection of a positive connection during a movement of the driverless transport vehicle at the throughput speed. Thus the movement of the transport vehicle can be easily guided or assisted.

According to a further form of embodiment the conveying system can comprise an orientation device for navigation of the movement of the driverless transport vehicle by means of a first type on the conveying plane, for example an optical guide, and/or by means of a second type on the climbing section, for example a track-guided and/or line-guided guide. Thus the navigation can be performed in a manner efficiently adapted to the required accuracy.

In respect of a method, the afore-mentioned object is achieved by a method for transporting piece goods with a driverless transport vehicle, comprising a chassis and a load handling device. The method comprises the method steps:
  a) Movement of the driverless means of transport on a conveying plane along an individual conveying section at a throughput speed to a climbing section negotiating a height difference.
  b) Formation of an energy transmission device from a climbing-section-side primary side for energy input and a chassis-side secondary side for energy pick-up with and/or without physical contact during a movement of the driverless transport vehicle at the throughput speed on the climbing section and/or a transition between the conveying plane and the climbing section.
  c) Negotiation of the transition and of the height difference on the climbing section at the throughput speed thanks to said energy pick-up by the driverless transport vehicle at the throughput speed.
  d) Detachment of the energy transmission device.

The energy transmission device can be implemented in a variety of ways. The sequence of the method steps can be adjusted according to the situation. Thus it is also possible for the secondary side already to supply all the additional energy required before the transition or at the start of the climbing section, such that the detachment of the energy transmission device does not take place at the end of the climbing section after the negotiation of the transition or of the entire climbing section.

According to a further form of embodiment the driverless transport vehicle can be guided on the conveying plane with a first type of orientation device. The way in which the orientation device is guided can be changed from a first type to a second type during a movement of the driverless transport vehicle at the throughput speed. And the driverless transport vehicle can be guided on the climbing section with the second type of orientation device. The way in which the orientation device is guided can be changed before, during or after a negotiation of the transition or during production of the energy transmission device; a brief overlap is possible here.

The inventive solution can be improved by various embodiments, each advantageous per se and which, where not stated otherwise, can be freely combined with one another. These forms of embodiment and the advantages associated with them are discussed below.

Forms of embodiment of the invention are explained in greater detail below on the basis of the figures by way of example, in which:

DETAILED DESCRIPTION OF THE INVENTION

Figure 1A:
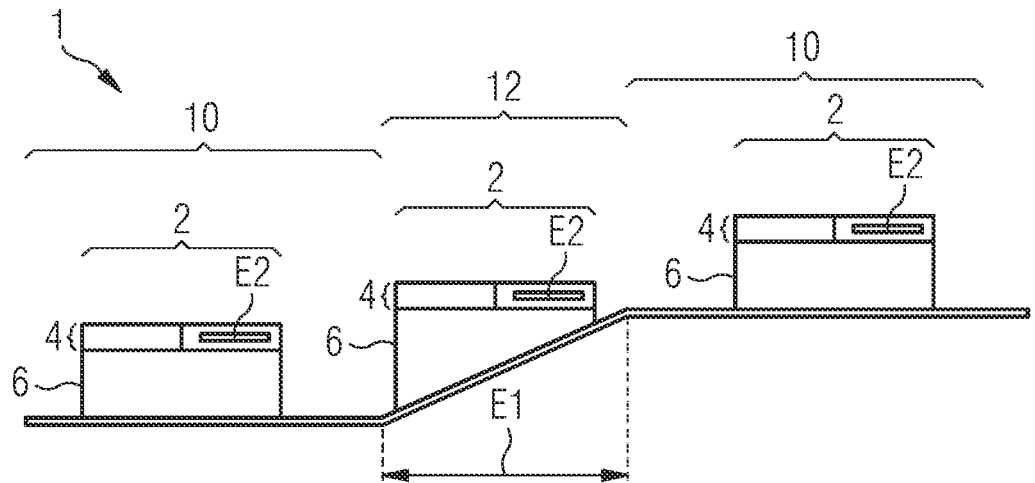
FIG. 1 shows an inventive conveying system in a side view and in a top view.
Figure 1B:
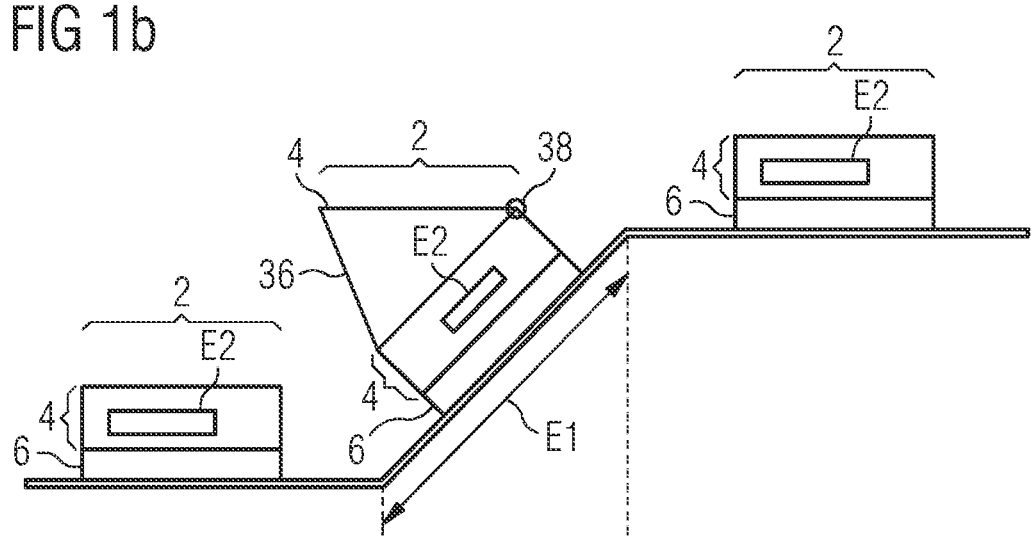
Figure 1C:
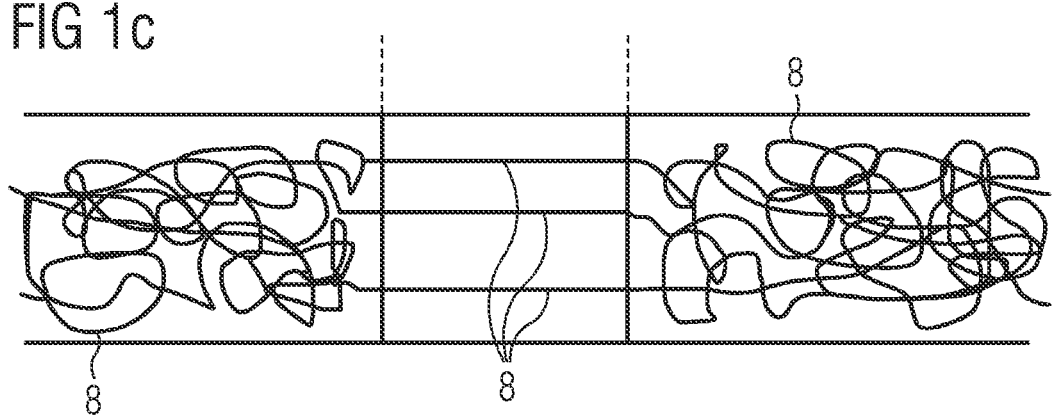

FIG. 1 schematically shows a side view (a, b) and a top view (c) of conveying systems 1 in accordance with forms of embodiment of the invention. A driverless transport vehicle (AGV) 2 which has a chassis 6 and a load handling device 4 is arranged on an upper and lower conveying plane 10 and on a climbing section 12. The load handling device 4 has an orientation device 36, by means of which the support surface of the load handling device 4 can always be arranged horizontally, even on an inclined surface and on the climbing section 12, such that an item of piece goods 14 lying on this support surface does not slip. The orientation device 36 in FIG. 1b actively engages at one edge of the load handling device 4, which is mounted about a horizontal axis 38 arranged at the opposing edge. This orientation device 36 is configured as biaxial. The two axes 38 can be arranged in parallel with one another as in FIG. 1b but need not be so, for example in the case of an orientation device 36 configured in the manner of a ship's compass. FIG. 1a) shows a central arrangement of the axis 38 with uniaxial suspension, which permits both an active and a passive configuration of the orientation device 36. A uniaxial orientation device 36 can be implemented in the manner of a Segway as a swinging, unstable system or as a simple tray mounted in the manner of a bucket, which itself in a swinging manner orients the load handling device 4 with an appropriate orientation on the climbing section 12.

An AGV 2 without an orientation device 36 can also be implemented, for which a lateral boundary of the load handling device 4 is necessary with effect from a particular gradient, so that an item of piece goods lying on the load handling device 4 does not slip off on the climbing section.

Because of the sorting geometry, containers of the load handling device 4 typically have a lateral boundary (edge) on their transverse side and no lateral boundary along their longitudinal side, since the unloading typically takes place via the longitudinal side. A lateral boundary is likewise possible in the case of a corresponding type of unloading. The AGV 2 is configured to negotiate the climbing section 12 longitudinally and/or transversely.

According to one form of embodiment a tilt articulation of the AGV 2, that can be used for unloading and that acts as an unloading device, is used as an orientation device 36.

The chassis 2 is dimensioned in a manner adjusted to a transition between the conveying plane 10 and the climbing section 12, such that the transition can be negotiated. This can be implemented for example in that a high ground clearance is achieved with large transport rollers, a transport-crawler-like configuration of the chassis 6, but also by an adjustment of the transition (smoothly rising transition, etc.).

The conveying system 1 has a climbing-section-side primary side E1 and a transport-vehicle-side secondary side E2. The primary side E1 and the secondary side E2 form an energy transmission device E, wherein the primary side E1 is configured for energy input and the secondary side E2 for energy output or withdrawal. The energy can be transmitted in a variety of ways: with and/or without physical contact, inductively electrically or via a direct electrically conductive contact, magnetically and/or mechanically. Mechanical energy transmission takes place by formation of a positive and/or frictionally engaged connection between the primary side E1 and the secondary side E2, such that primary side E1 and secondary side E2 can be mechanically coupled. The primary side E1 and the secondary side E2 can also at the same time be designed for different types of energy transmission (for example an electrical catenary, assisted by a circulating belt, into which the AGV 2 can engage). The primary side E1 can be arranged on and/or at and/or along and/or in and/or above the climbing section 12 and/or the transition and acts as a climbing section conveying aid.

The coupling of the primary and secondary side E1, E2 to form the energy transmission device E takes place during a movement of the AGV 2 at substantially the throughput speed of the AGVs 2, in order not to reduce the throughput. The throughput of the AGV 2 on the conveying plane 10 corresponds to the throughput on the climbing section 12 and on the transition. On the conveying plane 10 itself the AGV 2 can move along with its own energy supply. The additional energy supplied by the primary side can support the separate energy supply on the climbing section 12 and/or the transition or make it completely redundant.

The energy transmission can take place along the entire climbing section 12, or else the entire amount of energy can be transmitted all at once in the region of the transition. The throughput speed is the normal, maximum possible speed of the AGVs 2 on the conveying plane 10. The AGV 2 can move freely on the conveying plane 10, its conveying section 8 can be individually determined. On the climbing section 12 the AGV 2 covers a path 8 determined by the primary side E1. Multiple AGVs 2 form a transport vehicle convoy on the climbing section 12, the AGV 2 can travel freely on the conveying planes 10 and can break out of the transport vehicle convoy at any time.

The AGV 2 can, with the energy supplied by the primary side E1, which it withdraws with its secondary side E1, negotiate the transition and/or the climbing section 12 traveling freely with a separate drive. According to one form of embodiment the energy supply takes place in the region of the climbing section 12 by a conductive line or rail in the manner of an electric bus.

Alternatively a climbing-section-side drive exists which transports the AGV 2 completely or assists the separate drive of the AGV 2.

Initially the AGV 2 moves on the conveying plane 10 at the throughput speed to the transition and the climbing section 12. The climbing-section-side primary side E1 and the secondary side E2 of the AGV 2 form an energy transmission device E during a movement of the AGV 2 at the throughput speed. The primary side E1 supplies the secondary side E2 with energy—briefly and in a pulsed manner or else over the entire length of the climbing section 12. The energy transmission device is then detached.

Figure 2A:
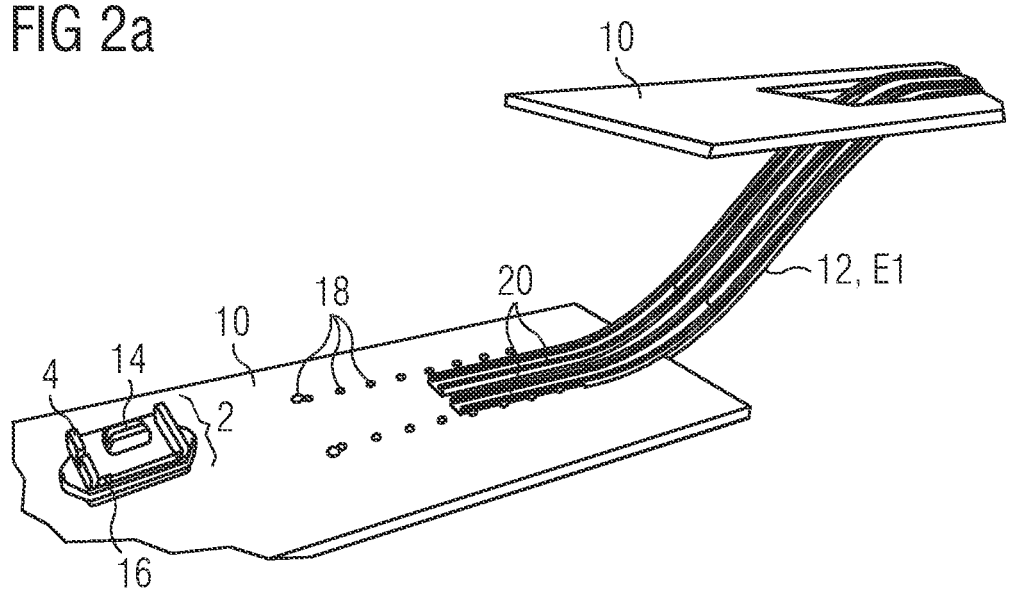
FIGS. 2a-2g show the travel of the conveying planes and the climbing section by a driverless transport vehicle in accordance with one form of embodiment.
Figure 2B:
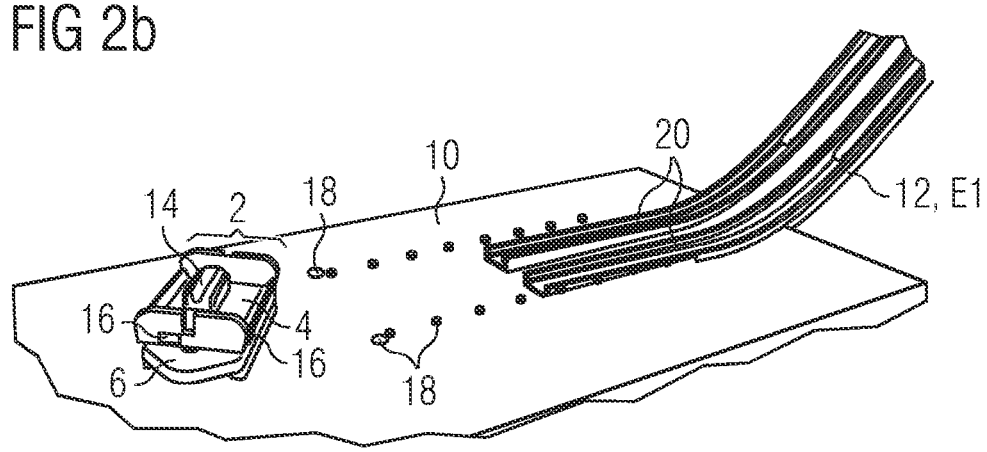
Figure 2C:
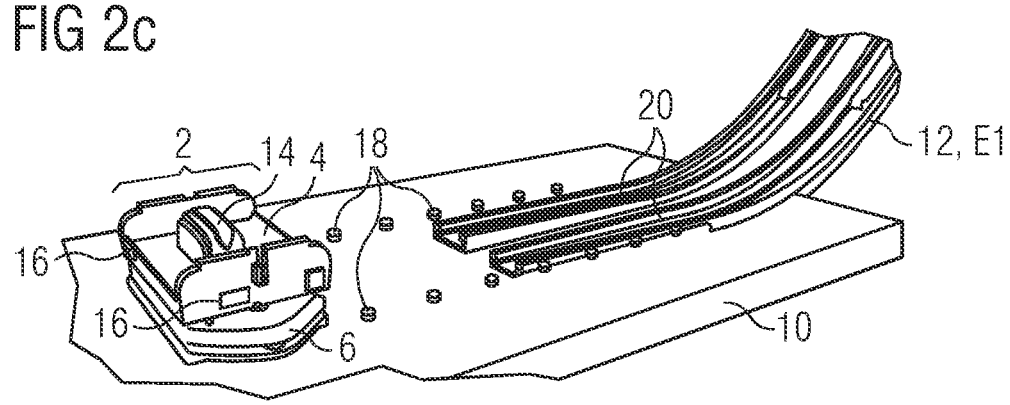

FIGS. 2*a*-2*g* show an inventive method for transporting an item of piece goods 14 with an AGV from a lower conveying plane 10 to an upper conveying plane 10 via a climbing section 12. On the lower conveying plane 10 the AGV 2 moves with a variable, changing orientation. While the AGV 2 is approaching the climbing section 12, it orients itself transversely (FIGS. 2*a*-2*c*). It would also be possible for the AGV 2 to travel over the climbing section 12 with a different orientation and for the load handling device 4 to likewise be oriented such that it can be oriented horizontally by the orientation device 34. It is also possible for the item of piece goods 14 to be secured differently (lateral boundary, being strapped down, etc.) on the load handling device 4 and without a horizontal orientation of the load handling device 4. With the assistance of a guide aid 18 and its orientation device 16 the AGV 2 can travel to a guide rail 20 and travel up onto this. The guide aid 18 permits the approximate positioning and orientation of the AGV 2, so that the insertion onto the guide rail 20 can take place at full throughput speed and it is not necessary to slow down for orientation immediately before the guide rail 20.

The orientation device 16 makes it possible to switch between different techniques for track guidance of the conveying section 8, for orientation and navigation of the AGV 2. Thus for the AGV 2 it is possible to follow a physical and/or a virtual guideline and to combine it with other navigation procedures. Thus for example an optical system can be used on the conveying plane 10, which is replaced by a track-guided system in the region of the transition and on the climbing section 12. A lower accuracy in position finding is unproblematic on the conveying plane 10. A higher accuracy is necessary to enable a connection of the primary side E1 and the secondary side E2 at full throughput speed. The guide aid 18 supports the switch from less accurate track guidance to more accurate track guidance.

In this form of embodiment the guide rail 20 starts on the lower conveying plane 10 and also extends over part of the upper conveying plane 10. The formation of the energy transmission device E takes place on the guide rail 20. The transition between the conveying plane 10 and the climbing section 12 here also includes the region of the guide aid 18 and guide rail 20 on the lower conveying plane 10.

Figure 2D:
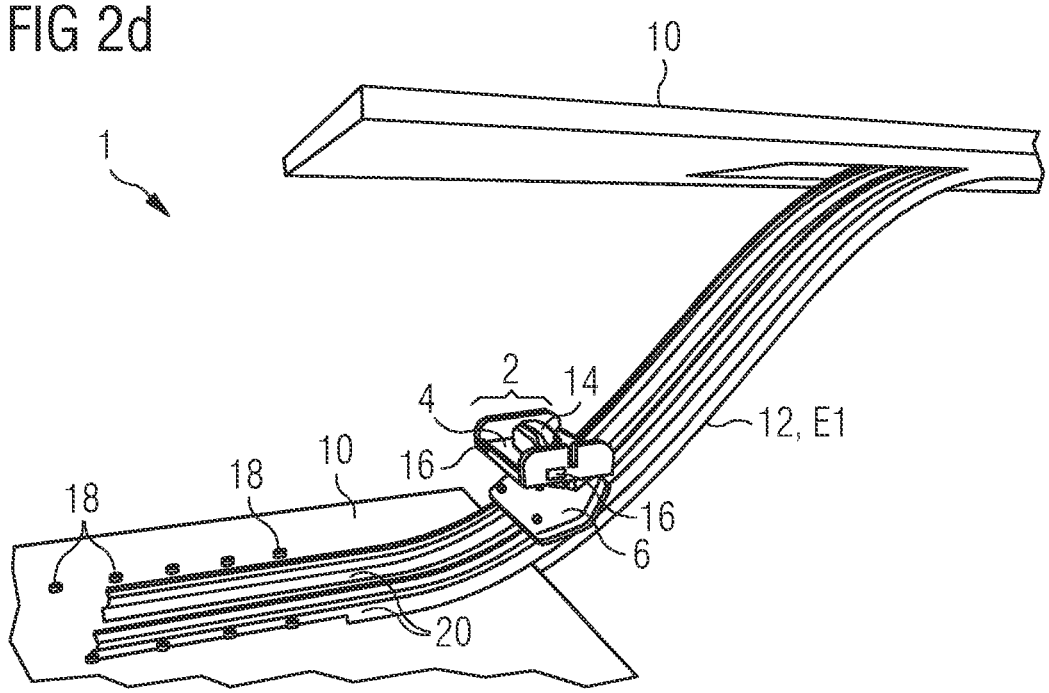
Figure 2E:
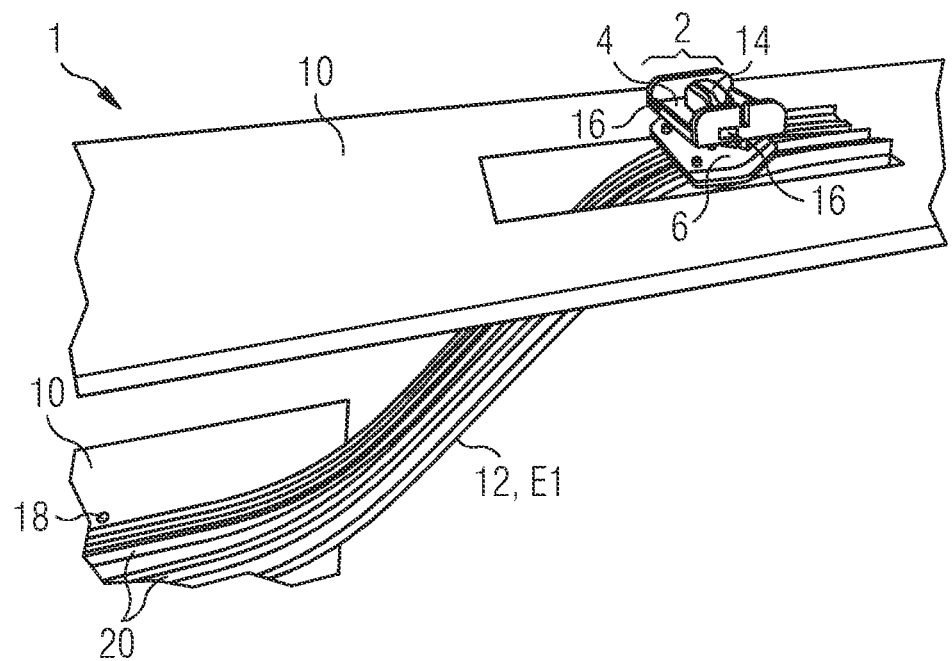
Figure 2F:
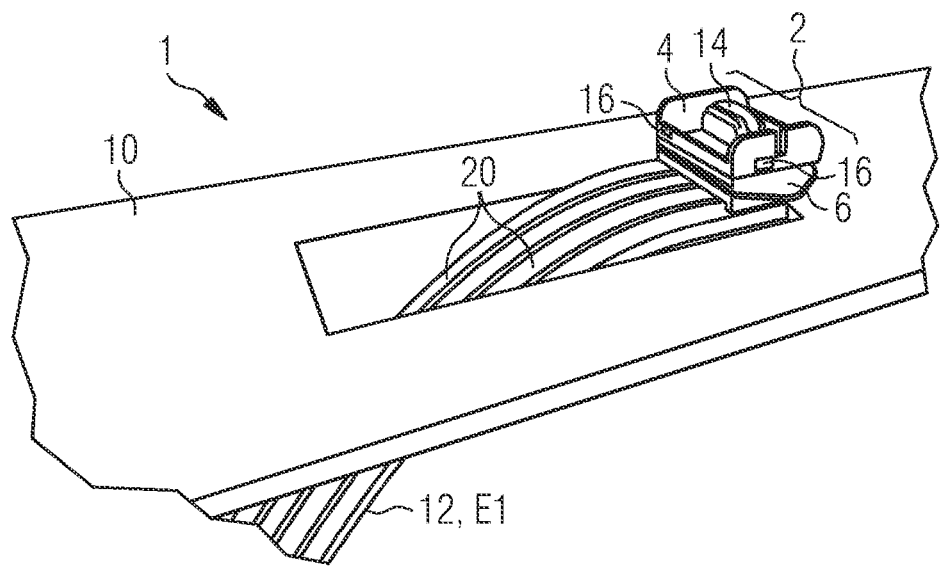
Figure 2G:
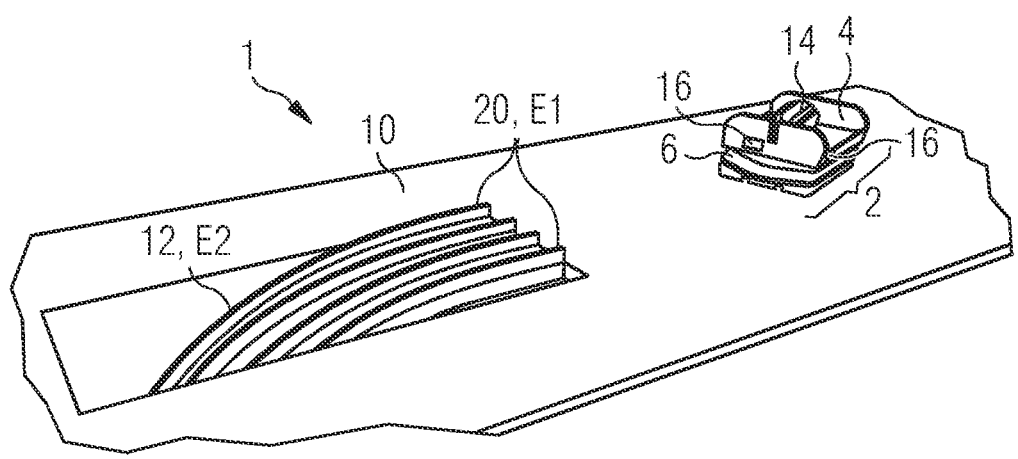

The load handling device 4 has a lateral boundary on the front and rear side, such that the item of piece goods 14 is well secured against slipping and falling off in the longitudinal direction caused by speed changes, without lateral loading and unloading being obstructed. Whereas the AGV 2 travels on the conveying plane 10 itself mostly in a longitudinal orientation (FIG. 2*a*), it negotiates the climbing section 12 with a transversely oriented chassis 6 (FIGS. 2*d*-*e*). So that the item of piece goods 14 on the climbing section 12 does not fall off laterally, the load handling device 4 on the climbing section 12 is continuously oriented by an orientation device 36 comprised by the AGV 2, such that the load handling device 4 is always oriented horizontally (FIGS. 2*c*-*f*). Once the AGV 2 has left the guide rail 20 it can turn again (FIG. 2*g*). A further movement of the transversely or completely variably oriented AGV 2 is likewise possible.

Another configuration with an AGV 2 turning while traveling over the climbing section 12, or negotiating the climbing section 12 with a longitudinally or otherwise variably oriented AGV 2 and an orientation device 26 adapted hereto is likewise possible. To enable a variable orientation of the AGV 2 the wheel deflection is not limited. Alternatively it is also possible to permit only one variability of the load handling device 4, for example by turning with a fixed chassis 6.

According to one form of embodiment the AGV 2 is configured to negotiate the transition and the climbing section 12 with its own drive. The conveying system 1 can be implemented with or without guide rails 20. With a configuration with guide rails 20 the AGV 2 can travel onto these autonomously. The AGV 2 can autonomously, with its own drive, travel up an inclined or helical vehicle track. To this end the AGV 2 travels at a throughput speed and with an approximately constant gap between the further AGV 2 autonomously or energy-assisted by an external traction means up or down a straight, curved or helical vehicle track. In all forms of embodiment the AGV 2 can start up again after stopping. Rolling back after stopping is prevented by a brake.

To be able to negotiate larger gradients, the AGV 2 draws energy from the climbing-section-side primary side E1 with its secondary side E2 and with this additional energy augments its own drive.

The energy can be transmitted electrically without physical contact (inductively) or via a conductive electrical contact (busbar, catenary, etc.). With assistance by the primary side E1 as an external energy supply the AGV 2 travels up the climbing section 12 with its own drive. When it stops the AGV 2 can start up again. Rolling back after stopping is prevented by a brake.

It is also possible on the climbing section 12 to move a first magnet along the conveying direction and to fit the AGV 2 with a second magnet following this first magnet upward or downward and in this way to assist the AGV 2.

In a further form of embodiment of a rail-bound configuration, but with a positive connection, the AGV 2 travels autonomously onto a rail system 20 and thereby engages a gear wheel coupled to its drive on a fixed rack rail in the gradient region or already in the region of the transition.

Figure 3:
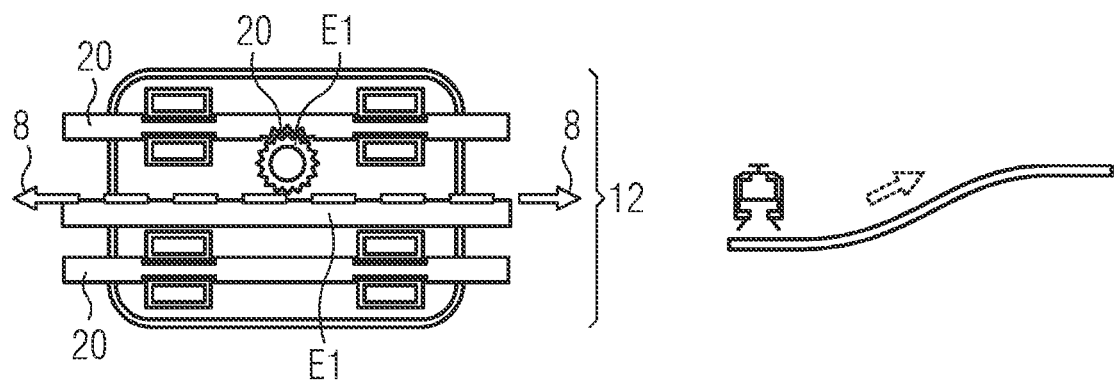
FIGS. 3-8 show different forms of embodiment of the energy transmission device together with drive facilities.

FIG. 3 shows a further form of embodiment in which the AGV 2 is rail-bound on the climbing section 12 and receives an energy supply from outside (from the primary side E1). A climbing-section-side guide rail 20 is shown in a top view, with a centrally arranged gear wheel which acts and is driven as a primary side E1. The transport-vehicle-side secondary side E2 must have a corresponding engagement. The energy required is provided by a busbar and/or without physical contact.

The AGV 2 here travels autonomously onto the rail system 20, and thereby brings a gear wheel coupled to the drive into engagement with a fixed rack rail in the gradient region. When it stops the AGV 2 can start up again. Rolling back after stopping is prevented by a brake.

This type of drive is known from rack railways. After travel onto the guide rail 20, the engagement can take place at full speed. The gear wheels E1 act as external drive means. The load handling device 4 is designed with a lateral boundary and in this form of embodiment does not have an orientation means 36. An orientation means 36 could however be integrated without difficulty.

In all forms of embodiment the AGV 2 can move both upward and downward along the climbing section 12. During a movement downward the primary side E1 supplies brake force in order to transport the AGV 2 downward in a controlled manner.

Figure 4:
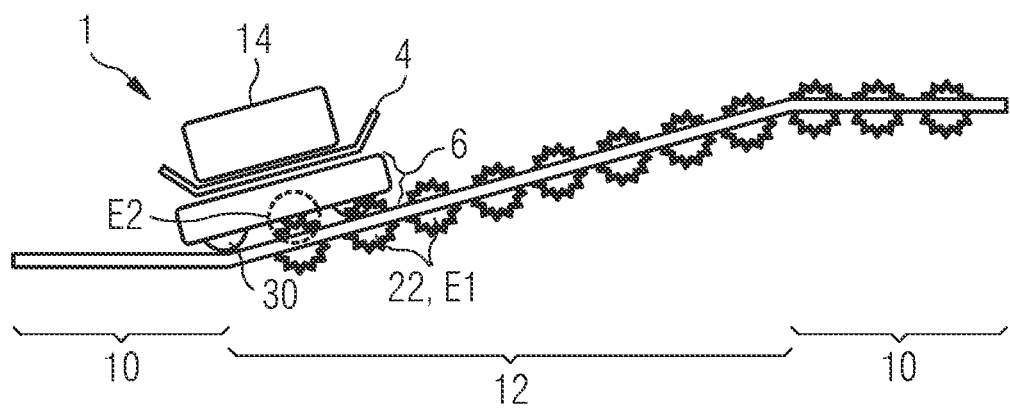

FIG. 4 shows an AGV 2, guided in guide rails 20 and driven by individual drive elements configured as gear wheels 22. Likewise possible are belt segments, chain segments, etc. The climbing section 12 has guide rails 20, the drive elements being arranged along the guide rails 20. The AGVs 2 insert themselves into the guide rails 20 as described above, are guided by these and are driven on the climbing section 12 by the drive elements. Likewise possible and illustrated below are conveying systems 1 with an external conveying means with or without support by the separate drive of the AGV 2. The separate drive is configured at least for movement on the conveying plane 10 with the separate energy supply (battery, etc.) of the AGV 2.

Figure 5:
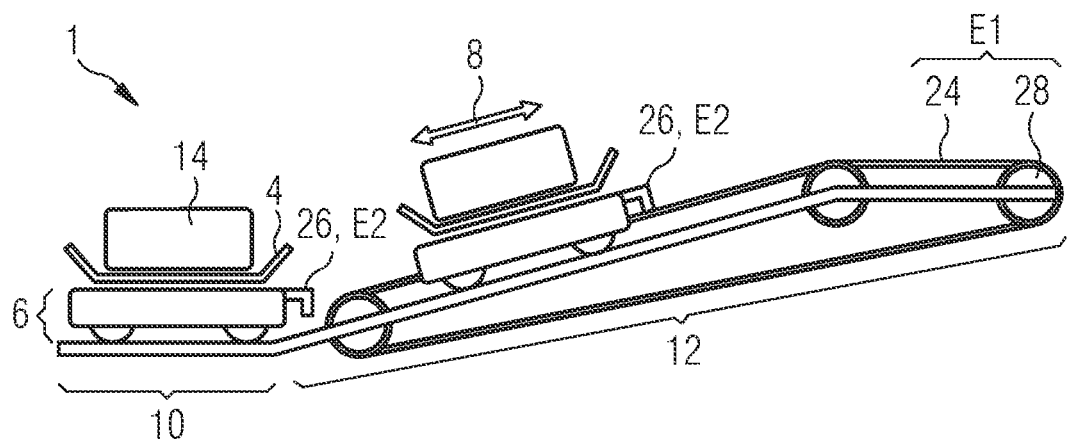

FIG. 5 shows in accordance with another form of embodiment a traction means, here configured as a circulating belt 24 which drags the AGV 2 without guide elements, acting as a primary side E1 and driven with drive means 28. The AGV 2 has a hooking device 26 to form a positive connection to the circulating belt 24. With this hooking device 26 the AGVs 2 can engage into the traction means and thus be pulled upward. The engagement and transport takes place in a similar manner to a cable car or a ski lift, but the hooking device can engage at any point. As a result the distance between two AGVs 2 can vary or be kept constant. Here too, an accurate orientation and positioning of the AGV 2 as described above is necessary before the transition is passed, so that the AGV 2 does not need to slow down in order to be connected to the circulating belt 24.

In the upper conveying plane 10 the AGVs 2 are automatically detached from the traction cable. The AGVs 2 can be pulled upward longitudinally or transversely, with or without an orientation device 36 to control the inclination of the load handling device 4.

Figure 6:
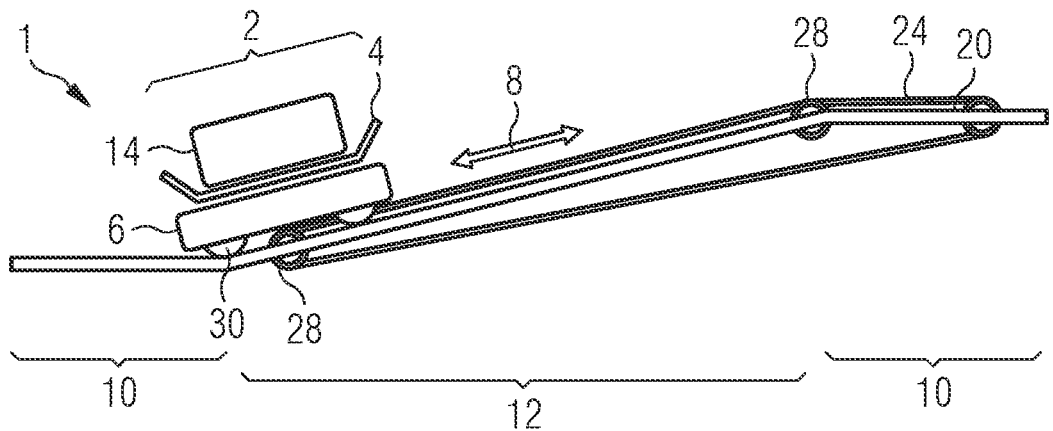

FIG. 6 shows according to another form of embodiment AGVs 2 guided in guide rails 20 as guide elements, transported by a traction means, here configured as a circulating belt 24. A climbing-section-side traction means can be configured as a chain, gear belt, traction cable, steel band (in which case the AGV would be fitted with a magnet), which runs at a constant throughput speed. The AGVs 2 insert themselves into the guide elements, are guided thereby and connect up actively and/or passively to the traction means. The traction means pulls the guided AGV 2 at a constant speed onto the upper conveying plane 10, where the AGV 2 actively and/or passively decouples itself from the traction means, thereby interrupts the energy transmission device E and leaves the guide system.

Figure 7:
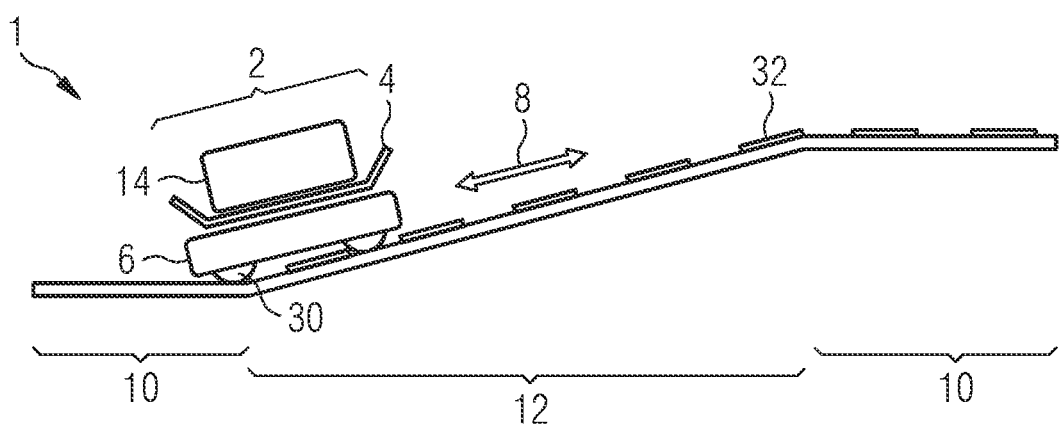

FIG. 7 shows in accordance with another form of embodiment AGVs 2 guided in guide rails 20 and driven by linear motors. The conveying system 1 comprises guide rails 20 (not affected by the cross-section) and as the primary side E1 linear motors as traction means 32, here arranged centrally. The AGVs 2 insert themselves into the guide elements, are guided thereby and are driven by the linear motors on the climbing section 12.

Figure 8:
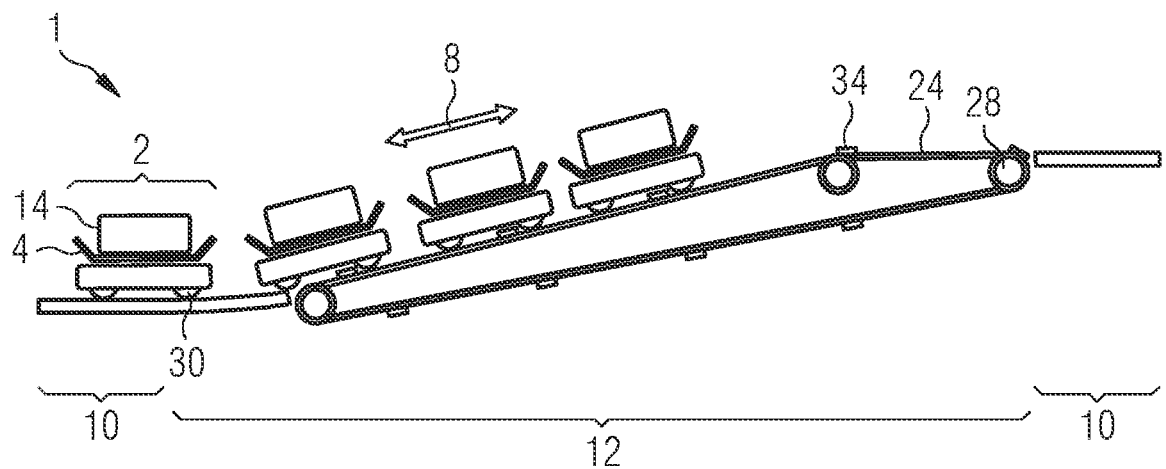

FIG. 8 shows according to another form of embodiment a climbing and link belt 24 provided with climbing links 34 which acts as a primary side E1. The transition between conveying plane 10 and climbing section 12 starts with a smooth ascent, the AGV 2 not being transported by the primary side E2 until after the start of the climbing section 12. The AGVs 2 travel autonomously on the circulating belt 24 (climbing and link belt) running at a constant throughput speed, and are transported upward thereby. Rolling back is prevented by a brake of the AGV 2, by the climbing links 34 on the climbing belt acting as cams and/or by wheels (for example in the manner of a shopping cart) locking on the circulating belt 24.

The inventive AGVs 2 can move autonomously to the climbing sections 10 and without any losses to throughput can negotiate a climbing section 12 and thus reach multiple conveying planes 10. This enables AGV-based conveying systems 1 to undertake three-dimensional sorting, commissioning and distribution tasks. It is possible to functionally emulate existing systems in airports and in the CEP field. The inventive step consists in fitting the AGV 2 with a secondary side E2 in terms of drive technology and energy such that the AGVs 2 can autonomously reach different conveying planes 10 without any losses to throughput.

In particular for smaller gradient angles the drive of the AGV 2 and the ascending/descending vehicle lane of the climbing section 12 can be designed such that the AGV 2 can move upward/downward under its own energy (without support from external drive means, at the most with external energy support by a primary side E1).

For larger gradient angles a force connection or positive connection to an external traction means 32 running at the throughput speed (rated speed) is produced. The external traction means 32 (cable, chain, gear belt, linear motors, gear wheels, etc.) transports the AGVs 2 on an ascending/descending track 8 freely or in a rail-bound manner onto another conveying plane 10. The AGVs 2 autonomously produce a force connection and/or positive connection, by synchronizing themselves with and connecting themselves to the external traction means 32.

On reaching the second conveying plane 10 the AGVs 2 autonomously (actively or automatically) release the connection to the external traction means.

Even larger gradient angles can be implemented by an inclination of the payload 14 adjusted to the gradient angle. In this case the acceptance of the payload on the load handling device 4 (tilt tray, crossbelt, tray, etc.) is pivoted in accordance with the gradient angle, such that the payload 14 and thus the load handling device 4 are in a horizontal position in the gradient region of the climbing section 12.

The inventive driverless transport vehicle 2 enables, together with the climbing section 12 provided with a primary side, vertical travel of a conveying system 2 at constant speeds by the formation of a detachable energy transmission device E.

The invention claimed is:
1. A driverless transport vehicle (Automated Guided Vehicle, AGV), comprising:
 a load handling device for accepting an item of piece goods;
 a chassis having a drive and an associated energy supply for moving on a conveying plane along an individual conveying section at a given throughput speed;

said chassis having a secondary side of an energy transmission device configured for energy pick-up in a contactless energy transfer or an energy transfer with contact during a movement on a climbing section during which the transport vehicle negotiates a height difference and/or in a transition to the climbing section, wherein the height difference is negotiated by energy received during the energy pick-up and/or the transition is negotiated at the given throughput speed; and at least one orientation device configured to pivotably mount said load handling device about at least one horizontal axis, enabling said load handling device to be actively and/or passively horizontally oriented both on the conveying plane and on the climbing section; and the driverless transport vehicle being configured to travel along the climbing section in a variable orientation.

2. The driverless transport vehicle according to claim 1, which further comprises an unloading device, which includes said orientation device.

3. A driverless transport vehicle (Automated Guided Vehicle, AGV), comprising:
a load handling device for accepting an item of piece goods;
a chassis having a drive and an associated energy supply for moving on a conveying plane along an individual conveying section at a given throughput speed;
said chassis having a secondary side of an energy transmission device configured for energy pick-up in a contactless energy transfer or an energy transfer with contact during a movement on a climbing section during which the transport vehicle negotiates a height difference and/or in a transition to the climbing section, wherein the height difference is negotiated by energy received during the energy pick-up and/or the transition is negotiated at the given throughput speed; and
the driverless transport vehicle being configured to travel along the climbing section in a variable orientation and configured to travel along the climbing section with a variable orientation of said chassis or with a fixed longitudinal or transverse orientation of said chassis and a variable or fixed orientation of said load handling device.

4. A driverless transport vehicle (Automated Guided Vehicle, AGV), comprising:
a load handling device for accepting an item of piece goods, said load handling device being a transport tray, a crossbelt, or a support surface;
a chassis having a drive and an associated energy supply for moving on a conveying plane along an individual conveying section at a given throughput speed;
said chassis having a secondary side of an energy transmission device configured for energy pick-up in a contactless energy transfer or an energy transfer with contact during a movement on a climbing section during which the transport vehicle negotiates a height difference and/or in a transition to the climbing section, wherein the height difference is negotiated by energy received during the energy pick-up and/or the transition is negotiated at the given throughput speed; and
the driverless transport vehicle being configured to travel along the climbing section in a variable orientation.

5. The driverless transport vehicle according to claim 4, wherein said load handling device is formed with a partial or complete lateral boundary.

6. The driverless transport vehicle according to claim 1, wherein said secondary side is configured to be mechanically connected to a primary side, and the primary side acts as a drive to negotiate the height difference.

7. The driverless transport vehicle according to claim 1, wherein said drive of said chassis is configured to be supplied with energy by the secondary side without physical contact, and the height difference is negotiated with said drive of said chassis.

8. The driverless transport vehicle according to claim 1, further comprising an orientation device for navigating the transport vehicle.

9. The driverless transport vehicle according to claim 8, wherein said orientation device is configured for at least one of an optical guidance system, a track-guided guidance system, or a line-guided guidance system.

10. A conveying system for transporting piece goods on a conveying plane, comprising:
a driverless transport vehicle configured to move on a conveying plane along an individual conveying section at a given throughput speed, said driverless transport vehicle comprising:
a load handling device for accepting an item of piece goods;
a chassis having a drive and an associated energy supply for moving on the conveying plane along the individual conveying section at the given throughput speed;
said chassis having a secondary side of an energy transmission device configured for energy pick-up in an energy transfer during a movement on a climbing section during which the transport vehicle negotiates a height difference and/or in a transition to the climbing section, wherein the height difference is negotiated by energy received during the energy pick-up and/or the transition is negotiated at the given throughput speed; and
said driverless transport vehicle being configured to travel along the climbing section in a variable orientation and the climbing section abutting the conveying plane and defining a height difference;
an energy transmission device being formed by a climbing-section-side primary side and the secondary side of said driverless transport vehicle, said energy transmission device being configured, during a movement of said driverless transport vehicle on the climbing section and/or at a transition to the climbing section, to effect an energy input into said driverless transport vehicle; and
wherein at least one of the height difference or the transition to the climbing section is negotiated by said driverless transport vehicle with the energy input at the throughput speed; and
wherein said primary side is configured for energy input with a fixed longitudinal or transverse orientation of said chassis of said driverless transport vehicle relative to the climbing section.

11. The conveying system according to claim 10, wherein said driverless transport vehicle is configured to move with a variable orientation and said energy transmission device is configured to transfer the energy input with or without physical contact.

12. The conveying system according to claim 10, wherein said primary side is configured for energy input with a variable longitudinal or transverse orientation of said chassis of said driverless transport vehicle relative to the climbing section.

13. The conveying system according to claim 10, wherein said primary side and said secondary side are configured to be mechanically connected and, while said primary and secondary sides are mechanically connected, said primary and secondary side form a drive to negotiate the height difference.

14. A conveying system for transporting piece goods on a conveying plane, comprising:
a driverless transport vehicle configured to move on a conveying plane along an individual conveying section at a given throughput speed, said driverless transport vehicle comprising:
a load handling device for accepting an item of piece goods;
a chassis having a drive and an associated energy supply for moving on the conveying plane along the individual conveying section at the given throughput speed;
said chassis having a secondary side of an energy transmission device configured for energy pick-up in an energy transfer during a movement on a climbing section during which the transport vehicle negotiates a height difference and/or in a transition to the climbing section, wherein the height difference is negotiated by energy received during the energy pick-up and/or the transition is negotiated at the given throughput speed; and
said driverless transport vehicle being configured to travel along the climbing section in a variable orientation and the climbing section abutting the conveying plane and defining a height difference;
an energy transmission device being formed by a climbing-section-side primary side and the secondary side of said driverless transport vehicle, said energy transmission device being configured, during a movement of said driverless transport vehicle on the climbing section and/or at a transition to the climbing section, to effect an energy input into said driverless transport vehicle; and wherein at least one of the height difference or the transition to the climbing section is negotiated by the driverless transport vehicle with the energy input at the throughput speed wherein said primary side and said secondary side are configured to engage in, or disengage from, a positive connection during a movement of the driverless transport vehicle at the throughput speed.

15. The conveying system according to claim 10, further comprising an orientation device for navigation of a movement of the driverless transport vehicle by way of a first type on the conveying plane and by way of a second type on the climbing section.

16. The conveying system according to claim 15, wherein the first type is an optical guide along the conveying plane and the second type is a track-guided or a line-guided guide on the climbing section.

17. A method for transporting piece goods with a driverless transport vehicle, the transport vehicle having a chassis and a load handling device, the method comprising the following method steps:
a) moving the driverless transport vehicle on a conveying plane along an individual conveying section at a throughput speed toward a climbing section defining a height difference;
b) forming an energy transmission device between a climbing section-side primary side for energy input and a chassis-side secondary side for energy pick-up with or without physical contact during a movement of the driverless transport vehicle at the throughput speed on the climbing section and/or at a transition between the conveying plane and the climbing section;
c) negotiating, with the driverless transport vehicle, the transition and the height difference of the climbing section at the throughput speed with energy transferred by way of the energy pick-up by the driverless transport vehicle at the throughput speed; and
d) disengaging the energy transmission device.

18. The method according to claim 17, which comprises:
a) guiding the driverless transport vehicle on the conveying plane with an orientation device of a first type;
b) changing a guidance type of the orientation device from the first type to a second type during a movement of the driverless transport vehicle at the throughput speed; and
c) guiding the driverless transport vehicle on the climbing section with an orientation device of the second type.

* * * * *